July 11, 1961 G. G. KELLER 2,991,668
UNIVERSALLY ADJUSTABLE WORK HOLDER AND DRILL JIG FIXTURE
Filed Sept. 12, 1960
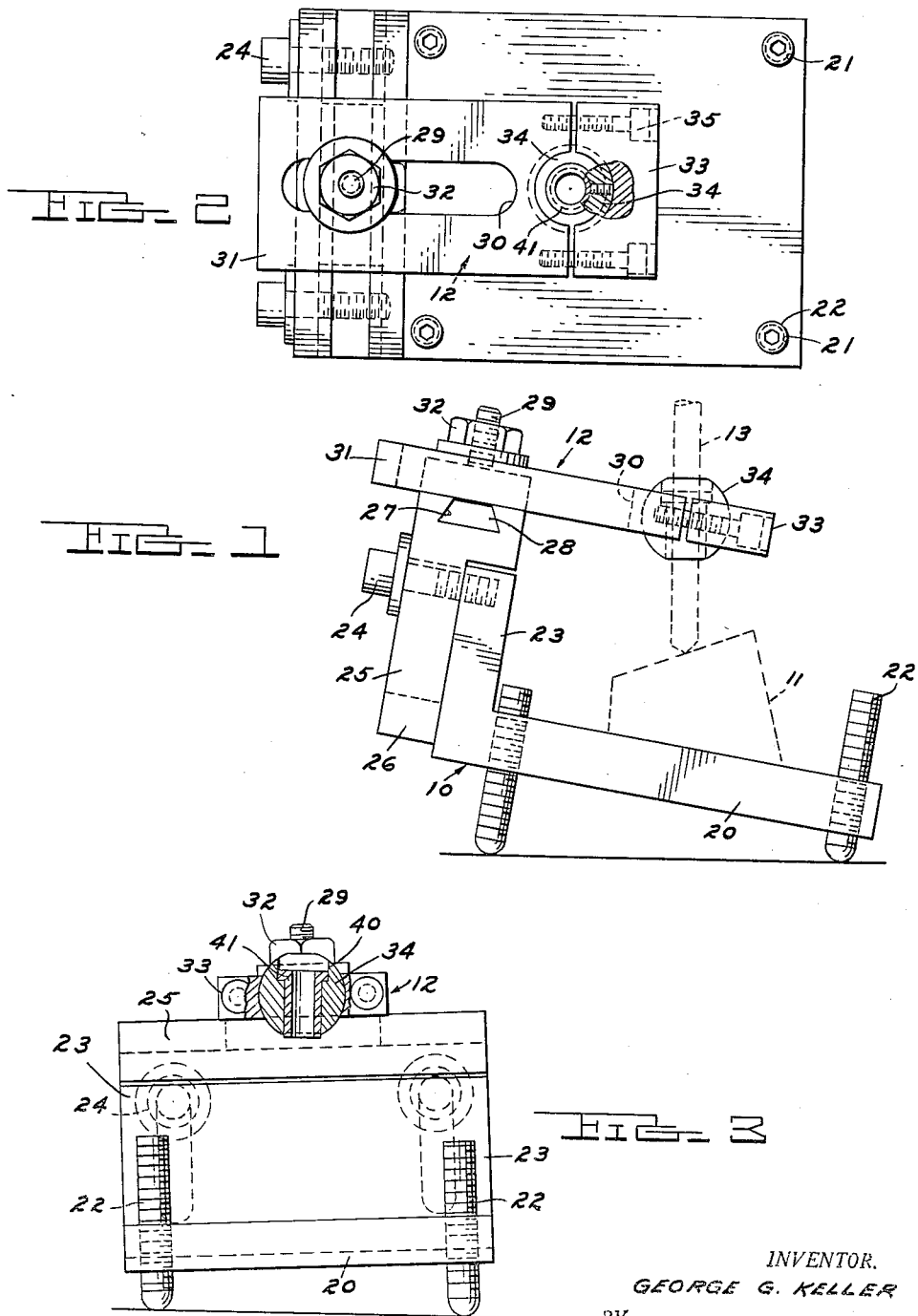
INVENTOR.
GEORGE G. KELLER
BY
ATTORNEY United States Patent Office 2,991,668
Patented July 11, 1961

2,991,668
UNIVERSALLY ADJUSTABLE WORK HOLDER
AND DRILL JIG FIXTURE
George G. Keller, 27088 Barrington Ave.,
Madison Heights, Mich.
Filed Sept. 12, 1960, Ser. No. 55,424
3 Claims. (Cl. 77—62)

This invention relates to a universally adjustable work holder and drill jig fixture which supports a work piece and drill relative to one another at any desired angle.

Work holders and drill fixtures have been employed heretofore to facilitate the drilling of a hole in a work piece at a compound angle, however, the several devices of the prior art have not proven entirely satisfactory inasmuch as they are complicated in design and construction, expensive to manufacture, and difficult to use.

With the foregoing in view, the primary object of the invention is to provide a universally adjustable work holder and drill jig fixture which is simple in design and construction, inexpensive to manufacture, easy to use, and easy to adjust.

An object of the invention is to provide a work holding and drill jig fixture which is capable of supporting the work piece at any desired compound angle relative to the drill jig.

An object of the invention is to provide a drill jig which is adaptable relative to the work piece holding portion to support the drill at any desired compound angle thereto.

An object of the invention is to provide a simple, easily adjustable, device which can be integrated with any drill press without major modifications and with complete facility.

An object of the invention is to provide a drill jig fixture and work holder which is extremely inexpensive so that the device of the invention is readily available to small shops and individuals.

These and other objects of the invention will become apparent by reference to the following description of a drill jig and work holding fixture embodying the invention taken in connection with the accompanying drawing in which:

FIG. 1 is a side elevational view of the device showing a drill and work piece in dotted lines.

FIG. 2 is a top plan view of the device seen in FIG. 1; and

FIG. 3 is an end elevational view of the device seen in FIG. 1 taken from the right side thereof.

Referring now to the drawing wherein like numerals refer to like and corresponding parts throughout the several views, the work holding and drill jig fixture disclosed therein to illustrate the invention comprises a universally adjustable base plate 10 for adjusting the angulation of the work piece 11 to any desired angle, and a universally adjustable drill jig fixture 12 adapted to support the drill 13 relative to the work piece 11 at any desired compound angle.

More particularly, the adjustable work holding portion 10 comprises a base plate 20 having four tapped holes 21 adjacent its four corners which carry the Allen screws 22 therein and by adjusting the Allen screws 22 in the threaded apertures 21 of the base plate 20 the angulation of the base plate 20 can be universally adjusted so as to position the work piece 11 at any desired angle relative to the drill 13. The base plate 20 has an upstanding flange 23 along one of its lineal edges which is equipped with threaded apertures which receive the clamping bolts 24 which lie in the slots 25 of the extension plate 26 securing same to the flange 23 upon loosening the bolts 24, the extension plate 26 can be moved upwardly and downwardly relative to the flange 23 to adjust the height thereof as desired.

The extension plate 26 along its top lineal edge has a female dove tail groove 37 which receives the male dovetail slide 28 upon which is secured the threaded stud 29 leading through the slot 30 of the arm 31 and the nut 32 holds the arm as adjustably positioned on the extension plate 26.

The arm 31 at its outer end is equipped with a hemispherical socket which in conjunction with the hemispherical socket in the nose piece 33 forms the universally adjustable seat for the ball 34; by loosening and tightening the bolts 35 the ball 34 can be secured in any desired angular adjusted relationship. The ball 34 has a counterbore 40 adjacent its top for the purpose of receiving and holding size adjusting bushings 41 therein so as to sleeve and support various size drills in conjunction therewith.

In operation the user places the work piece 11 on the base plate 20 and adjusts the leveling screws 22 so as to position the point and line of drilling in the work piece 11 relative to the drill 13 line of drilling as desired whereupon the user clamps with suitable means the base plate 20 to the drilling table or bed or secure same in any other desired manner and it has been found that the use of a magnetic chuck in the base plate 20 holds and positions the work piece satisfactorily.

The user then loosens the various connections to the drill supporting jig fixture and positions and locates the drill 13 relative to the drilling point and line of drilling relative to the work piece 11 and upon having same adjusted properly he tightens the bolts, nuts and screws to secure the device in supporting relationship to the drill 13.

By loosening the bolts 24 the extension plate 26 can be raised and lowered as desired; by loosening the nut 32 on the threaded stud 29 the male slide can be run back and forth in the female dovetail 27 so as to locate the arm anywhere along the dovetail slot and this in conjunction with the slot 30 in the arm itself not only provides for the transverse positioning of the arm 31 but also provides for the axially positioning and location of the arm 31 and it is obvious that the ball 34 can be angularly adjusted to suit the position and relationship of the arm.

The inventive drill jig and work holding device with these features constitutes a compact, durable, and efficient mechanism easily operated to support a work piece and drill relative to one another at any desired compound angle to accurately drill the work piece with a minimum of time and a maximum of accuracy.

Although but a single embodiment of the invention has been shown and described in detail, it is obvious that many changes may be made in the size, shape, detail, and arrangement of the various elements of the invention within the scope of the appended claims.

I claim:

1. A universally adjustable work holder and drill jig fixture for positioning and securing not only a point and line of drilling on a workpiece at the desired compound angular disposition relative to a drill but also to support the drill relative to the point and angular disposition of the workpiece comprising a base plate having four corners and a tapped hole adjacent each corner, screws disposed in said holes adapted to project beyond said base plate to contact a support table; said base plate being universally angularly adjustable relative to a support table via adjusting the extended projection of said screws; and upstanding flange on said base plate along one edge thereof having threaded apertures therein adjacent the top thereof; an extension plate overlying said flange and extending upwardly thereabove having slots therein overlying said flange threaded apertures, bolts extending through said extension plate being heightwise adjustable securable relative to said flange and base plate via said bolts and slots; said extension plate having a female dovetail slot opening upwardly; a male dovetail slide disposed in said female dovetail slot, a threaded stud on said slide extending above said slide, an arm abutting said extension plate top having a slot receiving said threaded stud, a nut on said threaded stud adjustably securing said arm to said extension plate; said arm extending over said base plate in spaced relationship and being heightwise, extensibly, and angularly adjustable relative thereto via said arm slot and threaded stud, said slide in said dovetail slot, and said extension plate relative to said flange on said base plate; said arm having a cantilevered end equipped with a clamping spherical ball socket; a ball disposed in said socket having a drill receiving guide aperture therein for receiving and holding a drill; said socket being selectively releasable and clampable for universally fixing said ball drill guide aperture at any adjusted compound angle for supporting a drill relative to a workpiece on said base plate; said device being easily operative by securing a workpiece on said base plate such as magnetically, adjusting the point and line of drilling in the workpiece relative to a drill via adjusting said screws and base plate on a supporting table, and then adjusting the drill guide structure relative to a drill.

2. A universally adjustable work holder and drill jig fixture for positioning and securing not only a point and line of drilling on a work piece at the desired compound angular disposition relative to a drill but also to support the drill relative to the point and angular disposition of the workpiece comprising a base plate having tapped holes, screws disposed in said holes adapted to project beyond said base plate to contact a support table; said base plate being universally angularly adjustable relative to support table via adjusting the extended projection of said screws relative to a support table; an upstanding flange on said base plate having threaded apertures therein, an extension plate overlying said flange and extending upwardly thereabove having slots therein overlying said flange threaded apertures, bolts extending through said extension plate being heightwise adjustably securable relative to said flange and base plate via said bolts and slots; said extension plate having a female dovetail slot opening upwardly; a male dovetail slide disposed in said female dovetail slot, a threaded stud on said slide extending above said slide, an arm abutting said extension plate top having a slot receiving said threaded stud with said slot at an angle to said dovetail slot, a nut on said threaded stud adjustably securing said arm to said extension plate; said arm extending over said base plate in spaced relationship and being heightwise, extensibly, and angularly adjustable relative thereto via said arm slot and threaded stud, said slide in said dovetail slot, and said extension plate relative to said flange on said base plate; said arm having a cantilevered and equipped with universally adjustable drill supporting means for supporting a drill relative to a work piece on said base plate; said device being easily operative by securing a workpiece on said base plate such as magnetically, adjusting the point and line of drilling in the workpiece relative to a drill via adjusting said screws and base plate on a supporting table, and then adjusting the drill guide and supporting structure relative to a drill.

3. A universally adjustable work holder and drill jig fixture for positioning and securing not only a point and line of drilling on a work piece at the desired compound angular disposition relative to a drill but also to support the drill relative to the point and angular disposition of the work piece comprising a supporting flange having threaded apertures therein, an extension plate overlying said flange and extending upwardly thereabove having slots therein overlying said flange threaded apertures, bolts extending through said extension plate slots screwed in said flange threaded apertures; said extension plate being heightwise adjustably securable relative to said flange and base plate via said bolts and slots; said extension plate having a female dovetail slot opening upwardly; a male dovetail slide disposed in said female dovetail slot, a theraaded stud on said slide extending above said slide, extending above said slide, an arm abutting said extension plate top having a slot receiving said threaded stud with said arm slot at an angle to said dovetail slot, a nut on said threaded stud adjustably securing said arm to said extension plate; said arm extending over said base plate in spaced relationship and being heightwise, extensibly, and angularly adjustable relative thereto via said arm slot and threaded stud, said slide in said dovetail slot, and said extension plate relative to said flange; said arm having a cantilevered end equipped with a clamping spherical ball socket; a ball disposed in said socket having a drill receiving guide aperture therein for receiving and holding a drill; said socket being selectively releasable and clampable for universally fixing said ball drill guide aperture at any adjusted compound angle for supporting a drill relative to a workpiece adjacent said flange; said device being easily opeartive by securing said flange adjacent a workpiece adjusting the point and line of drilling in the workpiece relative to a drill via adjusting adjustable holding means and then adjusting the drill guide structure relative to a drill.

References Cited in the file of this patent

UNITED STATES PATENTS

| | | |
|---|---|---|
| 741,364 | Ott | Oct. 13, 1903 |
| 2,369,425 | Becker | Feb. 13, 1945 |
| 2,501,036 | Fay | Mar. 21, 1950 |